US006457649B1

(12) United States Patent
Hileman

(10) Patent No.: US 6,457,649 B1
(45) Date of Patent: Oct. 1, 2002

(54) CARD DISPLAY PACKAGE

(75) Inventor: Martin H. Hileman, Beavercreek, OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/505,224

(22) Filed: Feb. 16, 2000

(51) Int. Cl.[7] .................................................. G06K 7/00
(52) U.S. Cl. ........................ 235/486; 235/445; 235/381; 235/488
(58) Field of Search ................................. 235/486, 488, 235/445, 381

(56) References Cited

U.S. PATENT DOCUMENTS

| 4,887,763 | A |   | 12/1989 | Sano |
| 5,427,832 | A |   | 6/1995 | Longtin |
| 5,609,253 | A |   | 3/1997 | Goade, Sr. |
| 5,629,977 | A |   | 5/1997 | Fonseca |
| 5,640,447 | A |   | 6/1997 | Fonseca |
| 5,650,209 | A |   | 7/1997 | Ramsburg et al. |
| 5,676,307 | A |   | 10/1997 | Martin |
| 5,740,915 | A |   | 4/1998 | Williams |
| 5,760,381 | A | * | 6/1998 | Stich et al. ................. 235/380 |
| 5,791,474 | A |   | 8/1998 | Hansen |
| 5,842,629 | A |   | 12/1998 | Sprague et al. |
| 5,884,456 | A | * | 3/1999 | Hansen ....................... 206/461 |
| 5,918,909 | A | * | 7/1999 | Fiala et al. ................... 283/61 |
| 5,949,058 | A | * | 9/1999 | Kimura ....................... 150/147 |
| 6,315,206 | B1 | * | 11/2001 | Hansen et al. ............... 235/380 |
| 6,349,829 | B1 | * | 2/2002 | Matheis et al. ............... 206/39 |

FOREIGN PATENT DOCUMENTS

GB          002135274 A   *   8/1984

OTHER PUBLICATIONS

AAA Hoosier Motor Club Medical Emergency and Rechargeable Phone Card packaging.

* cited by examiner

Primary Examiner—Michael G. Lee
Assistant Examiner—Daniel Walsh
(74) Attorney, Agent, or Firm—Killworth, Gottman, Hagan & Schaeff, LLP

(57) ABSTRACT

A card display packages is provided comprising front and rear panels and a card secured to the rear panel, wherein the panels and card are arranged so as to preserve uniform package thickness, provide for enhanced packaging security, and, is some cases, eliminate the need for making die cuts in manufacturing the package. In accordance with one embodiment of the present invention, a card display package is provided comprising a front panel, a rear panel, and a card. The front panel height is less than the rear panel height. The front panel is secured to the rear panel such that a card mounting zone is defined in a lower portion of the rear panel. The card may include a magnetic stripe and may be secured within the card mounting zone such that the magnetic stripe and a portion of the card extend beyond the bottom edge of the rear panel.

33 Claims, 4 Drawing Sheets

CARD DISPLAY PACKAGE

BACKGROUND OF THE INVENTION

The present invention relates to display packaging for pre-paid cards or wallet cards, i.e., debit cards, phone cards, membership cards, etc. More particularly, the present invention relates to a card display packaging arrangement that eliminates the need for interior die cutting in display packaging manufacture, preserves uniform packaging thickness, and provides for enhanced packaging security.

A number of card display packaging arrangements provide a convenient means by which a debit card or phone card may be packaged and displayed. However, these arrangements incorporate specific design elements that unnecessarily increase the costs associated with manufacturing, shipping, storing, and displaying the packages. Specifically, referring to U.S. Pat. No. 5,760,381, many of the arrangements illustrated therein require the card be sandwiched between two packaging panels. As a result, the resulting package is not of uniform thickness and, as the present applicant has recognized, is more difficult or costly to ship, store, and display. In one embodiment of U.S. Pat. No. 5,760,381, a transparent window is provided so that the entire front face of the card is visible. The present applicant has recognized, however, that this arrangement, as illustrated in FIG. 8 of U.S. Pat. No. 5,760,381, requires that a specialized die cut be executed in manufacturing the package. The present applicant has further recognized that the panel flaps created by the die cut adjacent the sides of the transparent window are subject to peeling or bending and, as such, may be problematic in manufacturing, storing, shipping, and displaying the package. Finally, the present applicant has recognized that existing card packaging arrangements do not incorporate security features for tamper prevention.

Accordingly, there is a need for a card display package that reduces the costs associated with manufacturing, storing, shipping, and displaying the package by preserving uniform package thickness, eliminating the need for interior die cuts in display packaging manufacture, and providing for enhanced packaging security.

BRIEF SUMMARY OF THE INVENTION

This need is met by the present invention wherein a card display package is provided comprising front and rear panels and a card secured to the rear panel, wherein the panels and card are arranged so as to preserve uniform package thickness, provide for enhanced packaging security, and, is some cases, eliminate the need for making die cuts in manufacturing the package.

In accordance with one embodiment of the present invention, a card display package is provided comprising a front panel, a rear panel, and a card. The front and rear panels define respective top, bottom, and first and second side edges. The front panel defines a front panel height dimension extending from the bottom edge of the front panel to the top edge of the front panel. The rear panel defines a rear panel height dimension extending from the bottom edge of the rear panel to the top edge of the rear panel. The front panel height is less than the rear panel height. The front panel is secured to the rear panel such that a card mounting zone is defined in a lower portion of the rear panel. The card mounting zone is bounded on four sides by the bottom edge of the front panel, the bottom edge of the rear panel, a lower portion of the first side edge of the rear panel, and a lower portion of the second side edge of the rear panel. The card may include a magnetic stripe and may be secured within the card mounting zone such that the magnetic stripe and a portion of the card extend beyond the bottom edge of the rear panel outside of the card mounting zone.

The card may comprise a mounted portion extending from a top edge of the card to the bottom edge of the rear panel and the card display package may further comprise a card cover secured to the rear panel about a periphery of the mounted portion of the card. The card cover may include tamper evident perforations arranged to provide an indication of whether an attempt has been made to separate the card cover from the card.

Preferably, the card thickness and the front panel thickness are substantially equal. More specifically, the respective thicknesses of the front panel, the rear panel, and the card are preferably selected such that the card display package defines a substantially uniform thickness from the top edge of the rear panel to the bottom edge of the rear panel.

The top edge, the bottom edge, and the first and second side edges of the front and rear panels are arranged in a generally rectangular or approximately quadrilateral orientation. The front panel and the rear panel may be formed in a single sheet of material and the top edge of the front panel and the top edge of the rear panel may be defined along a common fold line formed in the single sheet of material.

The card may be secured to the rear panel. More specifically, the card mounting zone of the rear panel may include a transparent window portion and the card may be secured to the transparent window portion.

In accordance with another embodiment of the present invention, a card display package is provided comprising a front panel, a rear panel, and a card. The front and rear panels define respective top, bottom, and first and second side edges. The front panel defines a front panel height dimension extending from the bottom edge of the front panel to the top edge of the front panel. The rear panel defines a rear panel height dimension extending from the bottom edge of the rear panel to the top edge of the rear panel. The front panel is secured to the rear panel such that a card mounting zone is defined in a lower portion of the rear panel. The card mounting zone defines a card mounting zone height extending from the bottom edge of the rear panel to the bottom edge of the front panel. The front panel height is less than the rear panel height by an amount approximately equal to the height dimension of the card mounting zone. The card may include a magnetic stripe and may be secured within the card mounting zone such that the magnetic stripe and a portion of the card extend beyond the bottom edge of the rear panel outside of the card mounting zone.

In accordance with yet another embodiment of the present invention, a card display package is provided comprising a front panel, a rear panel, and a card. The front and rear panels define approximate quadrilaterals having respective top, bottom, and first and second side edges. The front panel defines a front panel height dimension extending from the bottom edge of the front panel to the top edge of the front panel. The rear panel defines a rear panel height dimension extending from the bottom edge of the rear panel to the top edge of the rear panel. The front panel height is less than the rear panel height. The front panel is secured to the rear panel such that a card mounting zone is defined in a lower portion of the rear panel. The card mounting zone defines an approximate quadrilateral bounded by the bottom edge of the front panel, the bottom edge of the rear panel, a lower portion of the first side edge of the rear panel, and a lower portion of the second side edge of the rear panel. The card may include a magnetic stripe and may be secured within the card mounting zone such that the magnetic stripe and a portion of the card extend beyond the bottom edge of the rear panel outside of the card mounting zone.

Accordingly, it is an object of the present invention to provide a card display package that preserves uniform package thickness, provides for enhanced packaging security, and, is some cases, eliminates the need for making die cuts in manufacturing the package. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
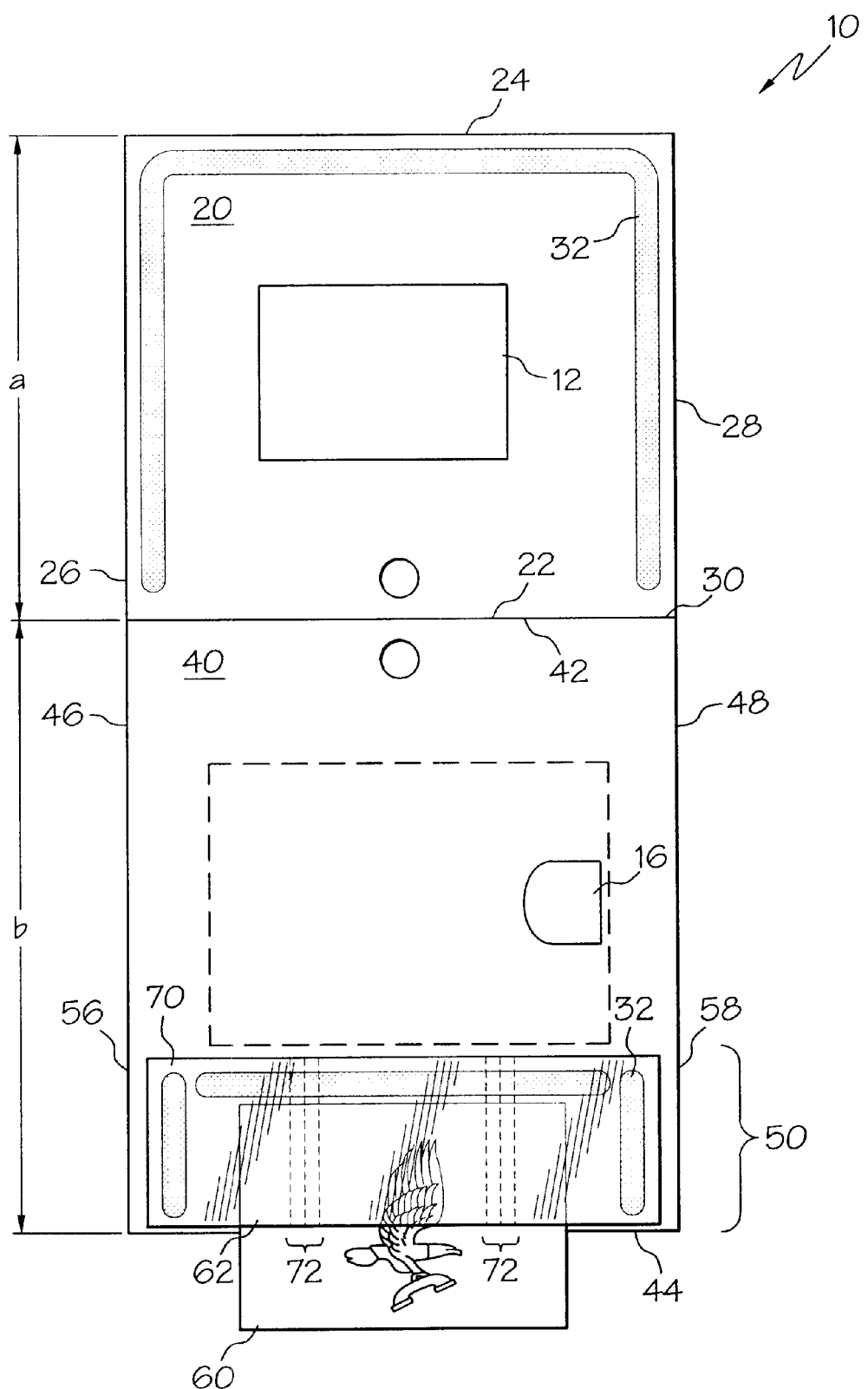
FIG. 1 is an illustration of a card display package according to one embodiment of the present invention.

Referring initially to FIGS. 1, 2A, 2B, and 2C, a card display package 10 according to one embodiment of the present invention is illustrated. The card display package 10 comprises, among other things, a generally rectangular front panel 20, a generally rectangular rear panel 40, and a card 60. The front panel 20 defines a top edge 22, a bottom edge 24, and first and second side edges 26, 28. Similarly, the rear panel 40 defines a top edge 42, a bottom edge 44, and first and second side edges 46, 48. It is noted that FIG. 1 illustrates the card display package 10 in an un-folded configuration and, as such, the top edge 22 of the front panel 20 is positioned below the bottom edge 24 of the front panel 20. Additional features of the card include a package insert 12 and a perforated flap 14. The flap 14 is arranged to permit access to the package insert 12 when the package 10 is in the folded configuration. The perforated flap 14 includes a thumb notch 16 to facilitate convenient access to the insert 12.

The front panel 20 and the rear panel 40 are preferably formed in a single sheet of material and the top edge 22 of the front panel 20 and the top edge 42 of the rear panel 40 are defined along a common fold line 30 formed in the single sheet of material. It is contemplated by the present invention, however, that the front and rear panels may be formed from two separate sheets. The front and rear panels 20, 40 define approximate quadrilaterals or, more specifically, generally rectangular quadrilaterals, i.e., right angled quadrilaterals. For the purposes of describing and defining the present invention, it is noted that a generally rectangular panel defines a rectangular outline but may include slight irregularities or non-linearities such as, for example, rounded corners. Similarly, an approximate quadrilateral defines a four sided polygon that may include similar slight irregularities or non-linearities.

The front panel 20 defines a front panel height dimension a extending from the bottom edge 24 of the front panel 20 to the top edge 22 of the front panel 20. The rear panel 40 defines a rear panel height dimension b extending from the bottom edge 44 of the rear panel 40 to the top edge 42 of the rear panel 40. The front panel height a is less than the rear panel height b. The front panel 20 is secured to the rear panel 40 such that an approximately quadrilateral card mounting zone 50 is defined in a lower portion of the rear panel 40. The card mounting zone 50 is bounded on four sides by the bottom edge 24 of the front panel 20, the bottom edge 44 of the rear panel 40, a lower portion 56 of the first side edge 46 of the rear panel 40, and a lower portion 58 of the second side edge 48 of the rear panel 40.

Figure 2A:
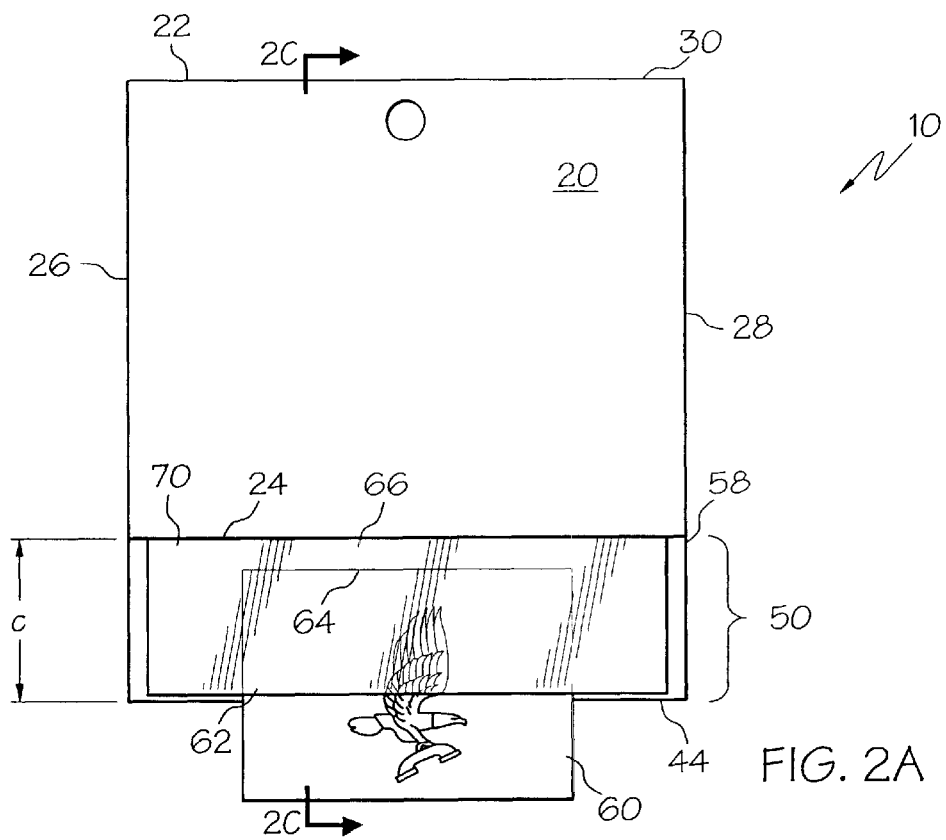
FIGS. 2A and 2B are front and rear views, respectively, of the card display package of FIG. 1 in a folded configuration.
Figure 2B:
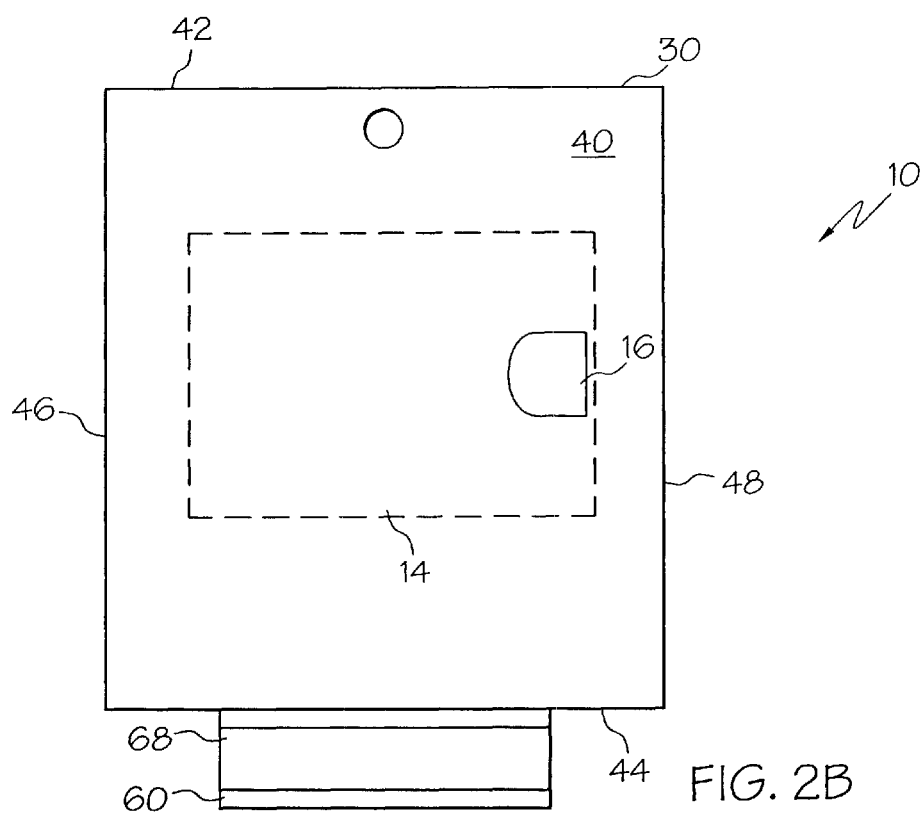
Figure 2C:
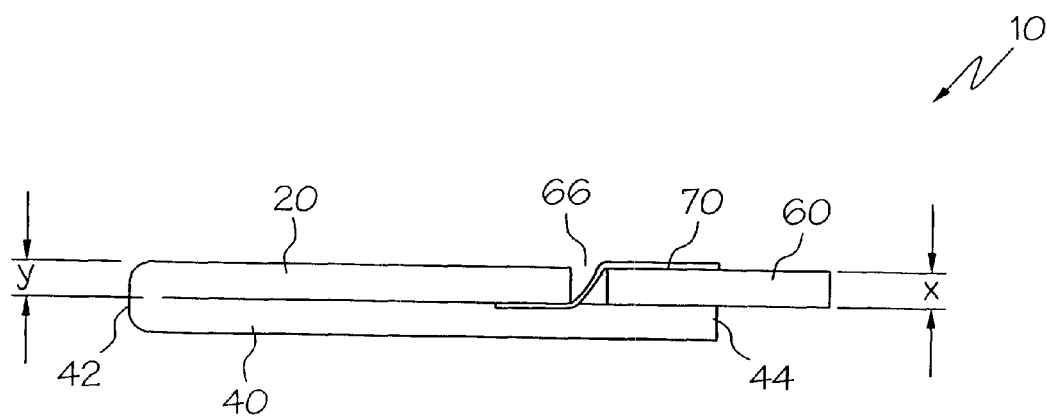
FIG. 2C is a cross sectional view taken along the line 2C—2C of FIG. 2A.

The card mounting zone 50 defines a card mounting zone height c (see FIG. 2A) extending from the bottom edge 44 of the rear panel 40 to the bottom edge 24 of the front panel 20. The front panel height a is less than the rear panel height b by an amount approximately equal to the height dimension c of the card mounting zone. In this manner, when the front panel 20 is folded about the common fold line 30 and secured to the rear panel 40, as is illustrated in FIGS. 2A and 2B, sufficient space is reserved on the rear panel 40 below the bottom edge 24 of the front panel 20 to permit the card 60 to be positioned and secured below the bottom edge 24 of the front panel. The card 60 defines a card thickness x and the front panel 20 defines a front panel thickness y. In the illustrated embodiment, the card thickness x and the front panel thickness y are substantially equal. In this manner, the respective thicknesses of the front panel 20, the rear panel 40, and the card 60 may be selected such that, in the folded configuration of FIGS. 2A, 2B, and 2C, the card display package 10 defines a substantially uniform thickness from the top edge 42 of the rear panel 40 to the bottom edge 44 of the rear panel 40. It is noted, however, that the card display package 10 includes a recessed gap 66 (see FIG. 2A) defined about a periphery of the card 60 in the card mounting zone 50 and that the substantially uniform thickness of the card display package 10 is not defined in the recessed gap 66. It is further noted that this embodiment of the present invention, eliminates the need to provide die cuts in the front and rear panels 20, 40 of the package 10.

The card 60 may include a magnetic stripe 68 and may be secured to the rear panel 40 within the card mounting zone 50 such that the magnetic stripe 68 and a portion of the card 60 extend beyond the bottom edge 44 of the rear panel 40 outside of the card mounting zone 50. The card display package 10 further comprises a card cover 70. The card 60 comprises a mounted portion 62 extending from a top edge 64 of the card 60 to the bottom edge 44 of the rear panel 40. The card cover 70 is secured to the rear panel 40 about a periphery of the mounted portion 62 of the card 60. Although FIG. 1 illustrates adhesive patterns 32 positioned to secure front panel 20 to the rear panel 40 and the card cover 70 to the rear panel 40, it is contemplated by the present invention that a variety of alternative securing schemes, e.g., staples, tape, clips, etc., may be employed for these purposes. In addition, the card 60 may be secured directly to the rear panel 40 with an adhesive (not shown) or may be secured to the card cover 70 which is, in turn, secured to the rear panel 40. In the case where the card 60 is secured to the card cover 70, spot fugitive non-shear glue may be employed between the card 60 and the card cover 70.

Figure 4:
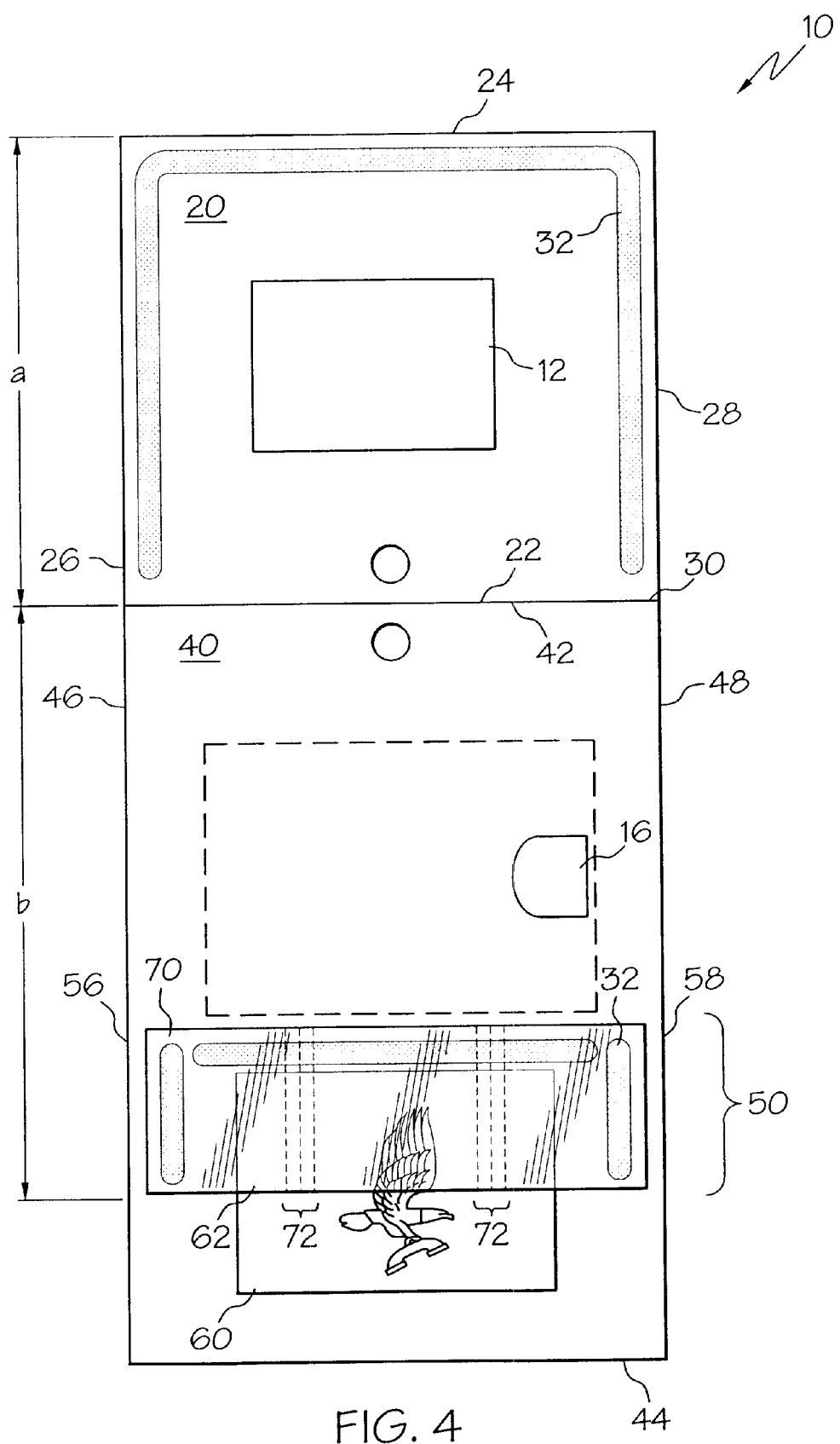
FIG. 4 is an illustration of a card display package according to an alternative embodiment of the present invention.

In the embodiment of the present invention illustrated in FIG. 4, the card display package 10 is arranged so that the card 60 does not extend beyond the bottom edge 44 of the rear panel 40. In this embodiment, the card 60 may not include a magnetic stripe and may be provided with an alternative encoding scheme accessible by an alternative reading means. For example, the card 60 illustrated in FIG. 4 may comprise an RF card, a smart card, etc. Thus, the embodiment illustrated in FIG. 4 is designed for application where it is not necessary to access the lower portion of the card 60 while the card is still in the display package 10.

The card cover 70 includes tamper evident perforations 72 therein (see FIG. 1). The tamper evident perforations 72 illustrated in FIG. 1 are of generally vertical orientation; however, it is noted that horizontal, diagonal, or multidirectional perforations may be provided in the card cover according to the present invention. The tamper evident perforations 72 are arranged to provide an indication of whether an attempt has been made to separate the card cover 70 from the card 60. Specifically, attempts to remove the card 60 from the package 10, replace the card 60 with a bogus card 60, or peel the card cover 70 away from the card 60 and view hidden PIN information on the card 60 will cause the card cover 70 to tear irreversibly along the perforations 72, providing a positive indication of tampering.

Figure 3:
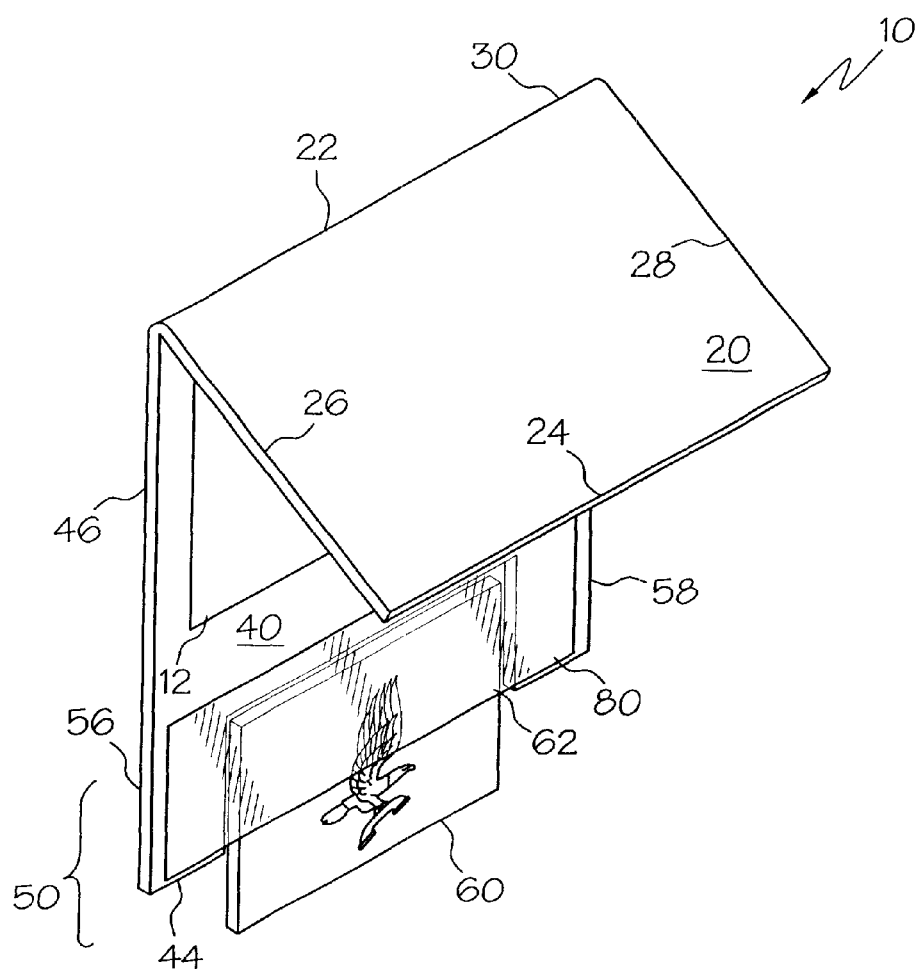
FIG. 3 is an illustration of a card display package according to an alternative embodiment of the present invention.

Referring now to the embodiment of FIG. 3, where like structure is indicated with like reference numerals, it is noted that the rear panel 40 may be arranged such that card cover 70 described in FIGS. 1, 2A, 2B, and 2C forms a transparent window portion 80 of the rear panel 40. In this embodiment, the rear panel 40 includes a generally U-shaped cut out over which the transparent window portion 80 is superimposed. In this embodiment, the card 60 is secured to the transparent window portion 80 via a patterned adhesive or other securing means (not shown) and the transparent window portion 80 is secured to the rear panel 40 via an additional patterned adhesive or other securing means (not shown).

Having described the invention in detail and by reference to preferred embodiments thereof, it will be apparent that modifications and variations are possible without departing from the scope of the invention defined in the appended claims.

What is claimed is:

1. A card display package comprising a front panel, a rear panel, and a card, wherein:
   said front panel defines a top edge, a bottom edge, and first and second side edges;
   said rear panel defines a top edge, a bottom edge, and first and second side edges;
   said front panel defines a front panel height dimension extending from said bottom edge of said front panel to said top edge of said front panel;
   said rear panel defines a rear panel height dimension extending from said bottom edge of said rear panel to said top edge of said rear panel;
   said front panel height is less than said rear panel height;
   said front panel is secured to said rear panel such that a card mounting zone is defined in a lower portion of said rear panel;
   said card mounting zone is bounded on four sides by said bottom edge of said front panel, said bottom edge of said rear panel, a lower portion of said first side edge of said rear panel, and a lower portion of said second side edge of said rear panel;
   said card defines a top edge, a bottom edge, and first and second side edges; and
   said card is mounted in said card mounting zone so that said top edge of said card does not extend beyond said bottom edge of said front panel.

2. A card display package as claimed in claim 1 wherein said card is secured within said card mounting zone such that a portion of said card extends beyond said bottom edge of said rear panel outside of said card mounting zone.

3. A card display package as claimed in claim 1 wherein said card includes a magnetic stripe and is secured within said card mounting zone such that said magnetic stripe and a portion of said card extend beyond said bottom edge of said rear panel outside of said card mounting zone.

4. A card display package as claimed in claim 1 further comprising a card cover secured to said rear panel about a portion of the periphery of said card, wherein said card cover includes tamper evident perforations therein, and wherein said tamper evident perforations are arranged to provide an indication of whether an attempt has been made to separate said card cover from said card.

5. A card display package as claimed in claim 1 wherein said card comprises a mounted portion extending from a top edge of said card to said bottom edge of said rear panel and wherein said card display package further comprises a card cover secured to said rear panel about a periphery of said mounted portion of said card, wherein said card cover includes tamper evident perforations therein, and wherein said tamper evident perforations are arranged to provide an indication of whether an attempt has been made to separate said card cover from said card.

6. A card display package as claimed in claim 1 wherein said card defines a card thickness, said front panel defines a front panel thickness, and said card thickness and said front panel thickness are substantially equal.

7. A card display package as claimed in claim 1 wherein respective thicknesses of said front panel, said rear panel, and said card are selected such that said card display package defines a substantially uniform thickness from said top edge of said rear panel to said bottom edge of said rear panel.

8. A card display package as claimed in claim 7 wherein said card display package includes a recessed gap defined about a periphery of said card in said card mounting zone, and wherein said substantially uniform thickness is not defined in said recessed gap.

9. A card display package as claimed in claim 1 wherein said front panel and said rear panel are formed in a single sheet of material and wherein said top edge of said front panel and said top edge of said rear panel are defined along a common fold line formed in said single sheet of material.

10. A card display package as claimed in claim 1 wherein said card is secured to said rear panel.

11. A card display package as claimed in claim 1 wherein:
    said top edge, said bottom edge, and first and second side edges of said front panel are arranged in a generally rectangular orientation; and
    said top edge, said bottom edge, and said first and second side edges of said rear panel are arranged in a generally rectangular orientation.

12. A card display package as claimed in claim 1 wherein said card mounting zone of said rear panel includes a transparent window portion and wherein said card is secured to said transparent window portion by an adhesive.

13. A card display package as claimed in claim 1 wherein said card display package includes a package insert disposed between said front and rear panels, wherein said rear panel defines a perforated flap, and wherein said perforated flap is arranged to permit access to said package insert.

14. A card display package comprising a front panel, a rear panel, and a card, wherein:
- said front panel defines a top edge, a bottom edge, and first and second side edges;
- said rear panel defines a top edge, a bottom edge, and first and second side edges;
- said front panel defines a front panel height dimension extending from said bottom edge of said front panel to said top edge of said front panel;
- said rear panel defines a rear panel height dimension extending from said bottom edge of said rear panel to said top edge of said rear panel;
- said front panel is secured to said rear panel such that a card mounting zone is defined in a lower portion of said rear panel;
- said card mounting zone defines a card mounting zone height extending from said bottom edge of said rear panel to said bottom edge of said front panel;
- said front panel height is less than said rear panel height by an amount approximately equal to said height dimension of said card mounting zone;
- said card defines a top edge, a bottom edge, and first and second side edges; and
- said card is mounted in said card mounting zone so that said top edge of said card does not extend beyond said bottom edge of said front panel.

15. A card display package as claimed in claim 14 wherein said card is secured within said card mounting zone such that a portion of said card extends beyond said bottom edge of said rear panel outside of said card mounting zone.

16. A card display package as claimed in claim 14 wherein said card includes a magnetic stripe and is secured within said card mounting zone such that said magnetic stripe and a portion of said card extend beyond said bottom edge of said rear panel outside of said card mounting zone.

17. A card display package as claimed in claim 14 further comprising a card cover secured to said rear panel about a portion of the periphery of said card, wherein said card cover includes tamper evident perforations therein, and wherein said tamper evident perforations are arranged to provide an indication of whether an attempt has been made to separate said card cover from said card.

18. A card display package as claimed in claim 14 wherein said card comprises a mounted portion extending from a top edge of said card to said bottom edge of said rear panel and wherein said card display package further comprises a card cover secured to said rear panel about a periphery of said mounted portion of said card, wherein said card cover includes tamper evident perforations therein, and wherein said tamper evident perforations are arranged to provide an indication of whether an attempt has been made to separate said card cover from said card.

19. A card display package as claimed in claim 14 wherein said card defines a card thickness, said front panel defines a front panel thickness, and said card thickness and said front panel thickness are substantially equal.

20. A card display package as claimed in claim 14 wherein respective thicknesses of said front panel, said rear panel, and said card are selected such that said card display package defines a substantially uniform thickness from said top edge of said rear panel to said bottom edge of said rear panel.

21. A card display package as claimed in claim 20 wherein said card display package includes a recessed gap defined about a periphery of said card in said card mounting zone, and wherein said substantially uniform thickness is not defined in said recessed gap.

22. A card display package as claimed in claim 14 wherein said card mounting zone of said rear panel includes a transparent window portion and wherein said card is secured to said transparent window portion by an adhesive.

23. A card display package as claimed in claim 14 wherein said card display package includes a package insert disposed between said front and rear panels, wherein said rear panel defines a perforated flap, and wherein said perforated flap is arranged to permit access to said package insert.

24. A card display package comprising a front panel, a rear panel, and a card, wherein:
- said front panel defines an approximate quadrilateral having a top edge, a bottom edge, and first and second side edges;
- said rear panel defines an approximate quadrilateral having top edge, a bottom edge, and first and second side edges;
- said front panel defines a front panel height dimension extending from said bottom edge of said front panel to said top edge of said front panel;
- said rear panel defines a rear panel height dimension extending from said bottom edge of said rear panel to said top edge of said rear panel;
- said front panel height is less than said rear panel height;
- said front panel is secured to said rear panel such that a card mounting zone is defined in a lower portion of said rear panel;
- said card mounting zone defines an approximate quadrilateral bounded by said bottom edge of said front panel, said bottom edge of said rear panel, a lower portion of said first side edge of said rear panel, and a lower portion of said second side edge of said rear panel;
- said card defines a top edge, a bottom edge, and first and second side edges; and
- said card is mounted in said card mounting zone so that said top edge of said card does not extend beyond said bottom edge of said front panel.

25. A card display package as claimed in claim 24 wherein said card is secured within said card mounting zone such that a portion of said card extends beyond said bottom edge of said rear panel outside of said card mounting zone.

26. A card display package as claimed in claim 24 wherein said card includes a magnetic stripe and is secured within said card mounting zone such that said magnetic stripe and a portion of said card extend beyond said bottom edge of said rear panel outside of said card mounting zone.

27. A card display package as claimed in claim 24 further comprising a card cover secured to said rear panel about a portion of the periphery of said card, wherein said card cover includes tamper evident perforations therein, and wherein said tamper evident perforations are arranged to provide an indication of whether an attempt has been made to separate said card cover from said card.

28. A card display package as claimed in claim 24 wherein said card comprises a mounted portion extending from a top edge of said card to said bottom edge of said rear panel and wherein said card display package further comprises a card cover secured to said rear panel about a periphery of said mounted portion of said card, wherein said card cover includes tamper evident perforations therein, and wherein said tamper evident perforations are arranged to provide an indication of whether an attempt has been made to separate said card cover from said card.

29. A card display package as claimed in claim 24 wherein said card defines a card thickness, said front panel defines a front panel thickness, and said card thickness and said front panel thickness are substantially equal.

30. A card display package as claimed in claim 24 wherein respective thicknesses of said front panel, said rear panel, and said card are selected such that said card display package defines a substantially uniform thickness from said top edge of said rear panel to said bottom edge of said rear panel.

31. A card display package as claimed in claim 30 wherein said card display package includes a recessed gap defined about a periphery of said card in said card mounting zone, and wherein said substantially uniform thickness is not defined in said recessed gap.

32. A card display package as claimed in claim 24 wherein said card mounting zone of said rear panel includes a transparent window portion and wherein said card is secured to said transparent window portion by an adhesive.

33. A card display package as claimed in claim 24 wherein said card display package includes a package insert disposed between said front and rear panels, wherein said rear panel defines a perforated flap, and wherein said perforated flap is arranged to permit access to said package insert.

* * * * *